(12) United States Patent
Sughrue et al.

(10) Patent No.: US 11,334,976 B1
(45) Date of Patent: May 17, 2022

(54) MEDICAL IMAGING WITH FUNCTIONAL ARCHITECTURE TRACKING

(71) Applicant: Omniscient Neurotechnology Pty Limited, Sydney (AU)

(72) Inventors: Michael Edward Sughrue, Brighton le Sands (AU); Stephane Philippe Doyen, Mount Kuring Gai (AU); Peter James Nicholas, South Hurstville (AU); Xinling Jiang, Willoughby (AU)

(73) Assignee: Omniscient Neurotechnology Pty Limited, Sydney (AU)

( * ) Notice: Subject to any disclaimer, the term of this patent is extended or adjusted under 35 U.S.C. 154(b) by 0 days.

(21) Appl. No.: 17/527,720

(22) Filed: Nov. 16, 2021

(51) Int. Cl.
| | |
|---|---|
| *G06K 9/00* | (2022.01) |
| *A61B 5/05* | (2021.01) |
| *G06T 5/50* | (2006.01) |
| *G06T 7/00* | (2017.01) |
| *G06F 3/04845* | (2022.01) |

(52) U.S. Cl.
CPC ............ *G06T 5/50* (2013.01); *G06F 3/04845* (2013.01); *G06T 7/0012* (2013.01); *G06T 2200/24* (2013.01); *G06T 2207/20092* (2013.01); *G06T 2207/20221* (2013.01); *G06T 2207/30016* (2013.01)

(58) Field of Classification Search
USPC ........ 382/100, 103, 106, 128–134, 154–155, 382/168, 173, 181, 199, 216, 254, 276, 382/286–291, 305; 600/411, 410; 378/4, 378/21, 74
See application file for complete search history.

(56) References Cited

U.S. PATENT DOCUMENTS

| | | | |
|---|---|---|---|
| 8,885,926 B2 | 11/2014 | Seung et al. | |
| 9,265,441 B2* | 2/2016 | Pereira | .................. A61B 5/055 |
| 9,563,950 B2* | 2/2017 | Raj | ........................ G06T 7/0016 |
| 9,741,114 B2* | 8/2017 | Varkuti | .................. A61B 6/037 |
| 9,940,712 B2 | 4/2018 | Henry et al. | |
| 10,586,326 B2 | 3/2020 | Silbersweig et al. | |
| 10,874,340 B2 | 12/2020 | Rau et al. | |
| 11,055,849 B2 | 7/2021 | Sughrue et al. | |
| 11,145,119 B2 | 10/2021 | Sughrue et al. | |
| 2003/0174873 A1 | 9/2003 | Giger et al. | |
| 2014/0316248 A1* | 10/2014 | deCharms | ............ A61B 5/0048 600/411 |
| 2014/0335489 A1 | 11/2014 | deCharms | |
| 2019/0090749 A1* | 3/2019 | Leuthardt | ............ A61B 5/4064 |
| 2019/0251450 A1 | 8/2019 | McIntosh et al. | |
| 2020/0005932 A1* | 1/2020 | Butz-Ostendorf | ..... G16H 30/40 |
| 2020/0033431 A1 | 1/2020 | Schlemper et al. | |

(Continued)

*Primary Examiner* — Seyed H Azarian
(74) *Attorney, Agent, or Firm* — Fish & Richardson P.C.

(57) ABSTRACT

Accessed from memory are i) a first brain image, ii) a second brain image, iii) a difference map, and iv) a connectivity element. A GUI may include: concurrently displaying each of these elements. User input to the GUI is received. A location of the user input is determined. The operations also include responsive to determining that the location of the user input is within the display of the first brain image, modifications are made to the display of the i) second brain image, ii) the difference map, and iii) the connectivity element to highlight elements of the display that correspond to an element of the first brain image that corresponds to the location of the user input.

17 Claims, 7 Drawing Sheets

(56) References Cited

U.S. PATENT DOCUMENTS

| | | | | |
|---|---|---|---|---|
| 2020/0167694 A1* | 5/2020 | Pisner | ................ | G06F 16/9024 |
| 2021/0118138 A1 | 4/2021 | Sughrue et al. | | |
| 2021/0118226 A1 | 4/2021 | Sughrue et al. | | |
| 2021/0401289 A1* | 12/2021 | Yamashita | ............. | A61B 5/055 |

* cited by examiner

MEDICAL IMAGING WITH FUNCTIONAL ARCHITECTURE TRACKING

TECHNICAL FIELD

This specification relates to medical imaging technology.

BACKGROUND

Medical imaging includes the technique and process of creating visual representations of the interior of a body for clinical analysis and medical intervention, as well as visual representation of the function of some organs or tissues (physiology). Medical imaging seeks to reveal internal structures hidden by the skin and bones, as well as to diagnose and treat disease. Medical imaging also establishes a database of normal anatomy and physiology to make it possible to identify abnormalities.

SUMMARY

This specification describes technologies for creating and displaying a difference-map image showing changes to a brain's functional architecture. These technologies generally involve comparing connectomes one brain image to another. The two brain images, a difference map of the connectomes, and other similar data can then be rendered for use by a user investigating the differences between the brain images.

In general, one innovative aspect of the subject matter described in this specification can be embodied in systems that one or more processors; and computer memory storing instructions that, when executed by the one or more processors, cause the one or more processors to perform operations. The operations include accessing, from a computer-accessible memory, i) a first brain image, ii) a second brain image, iii) a difference map, and iv) a connectivity element having properties representing differences in connectivity between the first brain image and the second brain image and rendering a graphical user interface (GUI), may include: concurrently displaying i) the first brain image, ii) the second brain image, iii) the difference map, and iv) the connectivity element. The operations also include receiving user input to the GUI. The operations also include determining a location of the user input. The operations also include responsive to determining that the location of the user input is within the display of the first brain image, modifying the display of the i) second brain image, ii) the difference map, and iii) the connectivity element to highlight elements of the display that correspond to an element of the first brain image that corresponds to the location of the user input. The operations also include responsive to determining that the location of the user input is within the display of the connectivity element, modifying the display of the i) first brain image, ii) second brain image, and iii) the difference map to highlight elements of the display that correspond to an element of the connectivity element that corresponds to the location of the user input. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination. The operations also include responsive to determining that the location of the user input is within the display of the second brain image, modifying the display of the i) first brain image, ii) the difference map, and iii) the connectivity element to highlight elements of the display that correspond to an element of the second brain image that corresponds to the location of the user input. The operations also include responsive to determining that the location of the user input is within the display of the difference map, modifying the display of the i) first brain image, ii) second brain image, and iii) the connectivity element to highlight elements of the display that correspond to an element of the difference map that corresponds to the location of the user input. Corresponding elements in the displays of the i) the first brain image, ii) the second brain image, iii) the difference map, and iv) the connectivity element have different relative pixel location. The operations further include accessing a translation map that records correspondences between pixels of the i) the first brain image, ii) the second brain image, iii) the difference map, and iv) the connectivity element such that the correspondences record the different relative pixel locations. The GUI is partitioned into sets of bounding boxes, such that bounding boxes of a given set are located on corresponding elements in the display. Concurrently displaying i) the first brain image, ii) the second brain image, iii) the difference map, and iv) the connectivity element may include displaying, without overlap i) the first brain image, ii) the second brain image, iii) the difference map, and iv) the connectivity element. Concurrently displaying i) the first brain image, ii) the second brain image, iii) the difference map, and iv) the connectivity element may include displaying the difference map over at least one of the group may include of i) the first brain image, and ii) the second brain image. The connectivity element may include a two-dimensional matrix storing data in cells of the matrix to represent connectivity values. Implementations of the described techniques may include hardware, a method or process, or computer software on a computer-accessible medium.

The subject matter described in this specification can be implemented in particular embodiments so as to realize one or more of the following advantages. The subject matter described in this specification advances medical imaging technology, e.g., the technologies of diagnostic assessments, therapeutic interventions, and neurosurgery. This technology allows for images to be created that show the effect of an event on the brain or differences between example and aggregate brains of different populations. The subject matter described in this specification can allow for new images useful in a variety of areas. Such images can capture the effect of neurosurgical interventions that require the removal of brain tissue, causing a difference in shape of the brain. These images can capture brain-architecture differences between populations (e.g., those with and without a particular disease). This technology can advantageously automatically account for the changes in shape and correctly show a change in the brain's connectome, even when the change in shape moves a functional node inside the brain of the patient. A difference-map image made possible by the subject matter described in this specification, and the difference-map from which the image is rendered may be used to advantageously drive a number of processes. For example, the connectome-difference map can be projected over an image of the subject's brain to aid in understanding the impact of the event. The connectome-difference map can be used as an input to a function to generate a proposed therapy plan for the subject, providing new and better therapy plans than would be available otherwise. The connectome-difference map can be used to generate automated data sets that describe a class of events, providing a deeper and more accurate data set than would be available otherwise. This technology can be useful in guiding surgeries, where for a specific patient a clinician can learn of deficient networks where little harm will be done and effective networks worth avoiding and preserving. Patterns of change in the difference image can be used to identify and classify specific disease states, including Alzheimer's as one example. Recovery over time can be monitored for a specific patient, instead of relying on estimated recovery timelines. The effectiveness of particular treatments for particular patients can be monitored.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The subject matter described in this specification can subtract a connectome generated for a subject's brain before an event from a connectome generated for the same brain after the brain has undergone one or more events that can cause a change to the brain's functional architecture. In this way, the impact of the event on the subject can be recorded and/or visualized into new kinds of images, and/or used as inputs for new types of computational processes able to produce new and useful outputs not previously possible. These outputs may be useful alone, or may be useful when combined with human actions. For example, a surgeon that would otherwise plan a surgery based on intuition and training can be informed using the subject matter described in this specification to generate a surgical-plan assessment based on historic, and objective, data collection and processing.

Figure 1A:
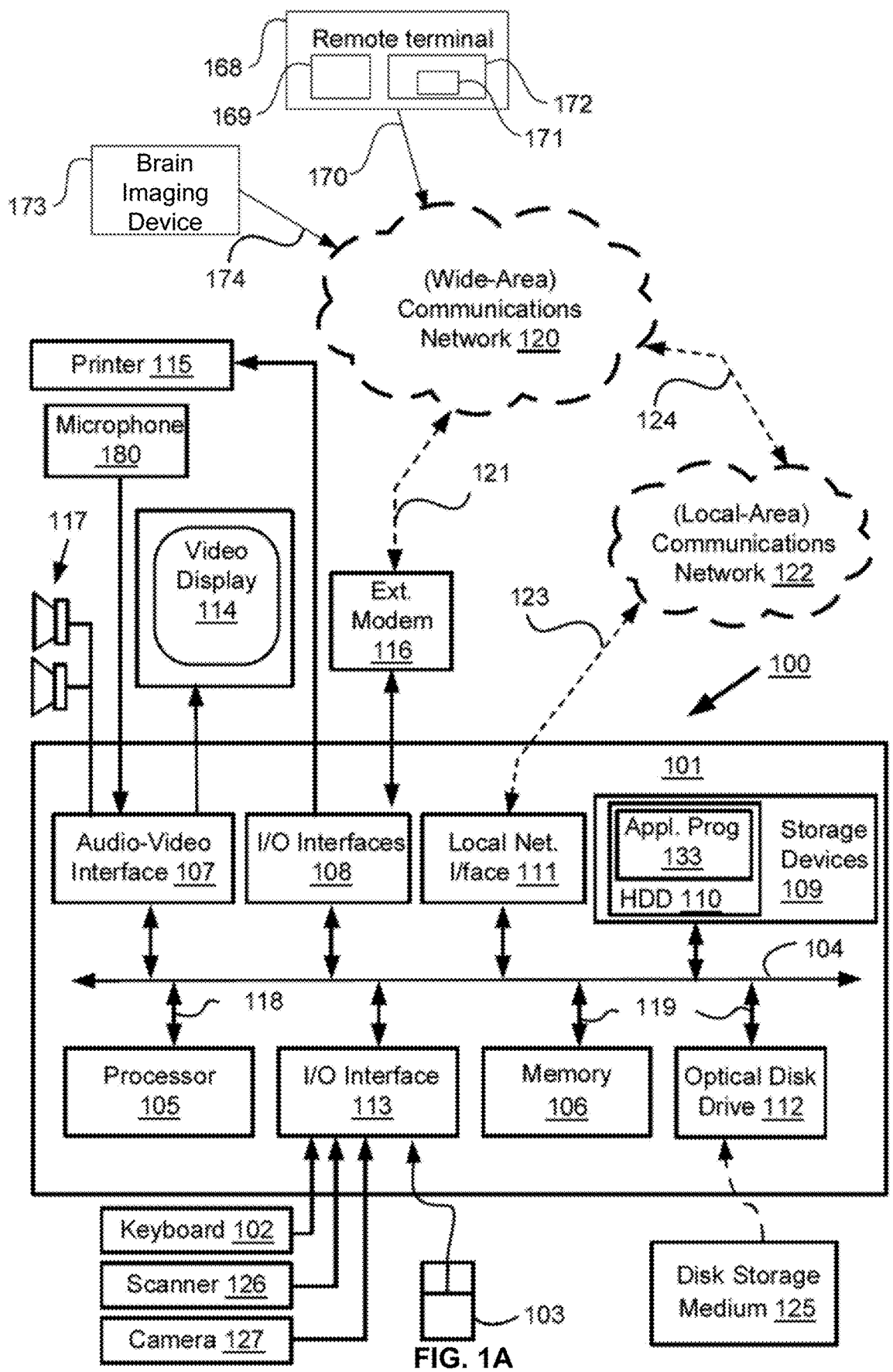
FIGS. 1A and 1B show an example computer system.
Figure 1B:
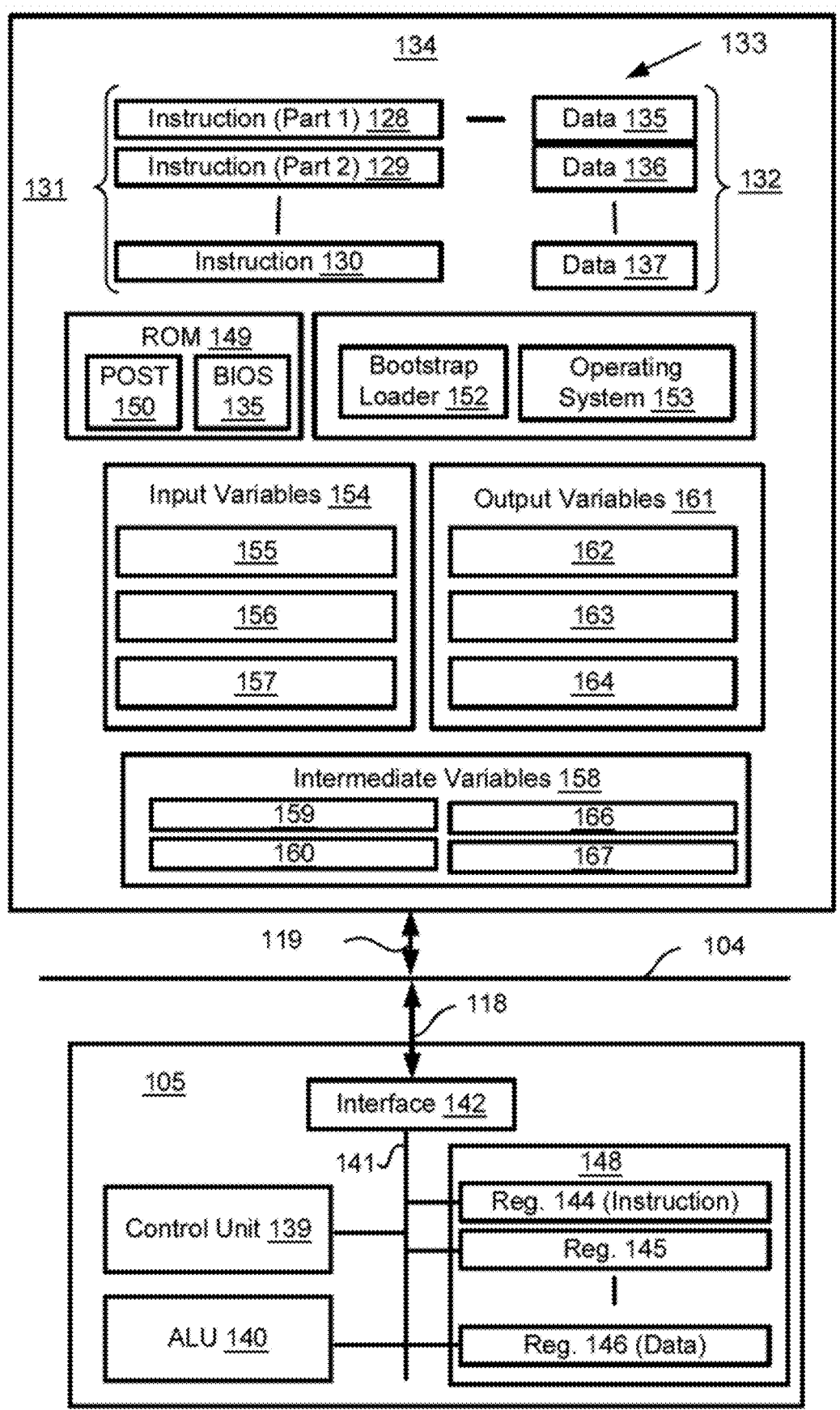

FIGS. 1A and 1B are block diagrams of a general-purpose computer system 100 upon which one can practice arrangements described in this specification. The following description is directed primarily to a computer server module 101. However, the description applies equally or equivalently to one or more remote terminals 168.

As seen in FIG. 1A, the computer system 100 includes: the server computer module 101; input devices such as a keyboard 102, a pointer device 103 (e.g., a mouse), a scanner 126, a camera 127, and a microphone 180; and output devices including a printer 115, a display device 114 and loudspeakers 117. An external Modulator-Demodulator (Modem) transceiver device 116 may be used by the computer server module 101 for communicating to and from the remote terminal 168 over a computer communications network 120 via a connection 121 and a connection 170. The aforementioned communication can take place between the remote terminal 168 and "the cloud" which in the present description comprises at least the one server module 101. The remote terminal 168 typically has input and output devices (not shown) which are similar to those described in regard to the server module 101. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer server module 101 typically includes at least one processor unit 105, and a memory unit 106. For example, the memory unit 106 may have semiconductor random access memory (RAM) and semiconductor read only memory (ROM). The remote terminal 168 typically includes as least one processor 169 and a memory 172. The computer server module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may include an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial or parallel connectivity; the former may be implemented according to the Universal Serial Bus (USB) standards and having corresponding USB connectors (not illustrated). Storage memory devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119.

The techniques described in this specification may be implemented using the computer system 100, e.g., may be implemented as one or more software application programs 133 executable within the computer system 100. In some implementations, the one or more software application programs 133 execute on the computer server module 101 (the remote terminal 168 may also perform processing jointly with the computer server module 101), and a browser 171 executes on the processor 169 in the remote terminal, thereby enabling a user of the remote terminal 168 to access the software application programs 133 executing on the server 101 (which is often referred to as "the cloud") using the browser 171. In particular, the techniques described in this specification may be effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the described techniques and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. Software modules for that execute techniques described in this specification may also be distributed using a Web browser.

The software 133 is typically stored in the HDD 110 or the memory 106 (and possibly at least to some extent in the memory 172 of the remote terminal 168). The software is loaded into the computer system 100 from a computer readable medium, and executed by the computer system 100. Thus, for example, the software 133, which can include one or more programs, may be stored on an optically readable disk storage medium (e.g., CD-ROM) 125 that is read by the optical disk drive 112. A computer readable medium having such software or computer program recorded on it is a computer program product.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. For example, through manipulation of the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 can execute. The POST program 150 can be stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 can activate the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high-level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source 173, e.g., a brain imaging device 173 such as an Mill or DTI scanner, across one of the networks 120, 122, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

Some techniques described in this specification use input variables 154, e.g., data sets characterizing the brain of a patient, which are stored in the memory 134 in corresponding memory locations 155, 156, 157. The techniques can produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle can include i) a fetch operation, which fetches or reads an instruction 131 from a memory location 128, 129, 130; ii) a decode operation in which the control unit 139 determines which instruction has been fetched; and iii) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the techniques described in this specification may be associated with one or more segments of the program 133 and is performed by the register section 144, 145, 146, the ALU 140, and the control unit 139 in the processor 105 working together to perform the fetch, decode, and execute cycles for every instruction in the instruction set for the noted segments of the program 133. Although a cloud-based platform has been described for practicing the techniques described in this specification, other platform configurations can also be used. Furthermore, other hardware/software configurations and distributions can also be used for practicing the techniques described in this specification.

Figure 2:
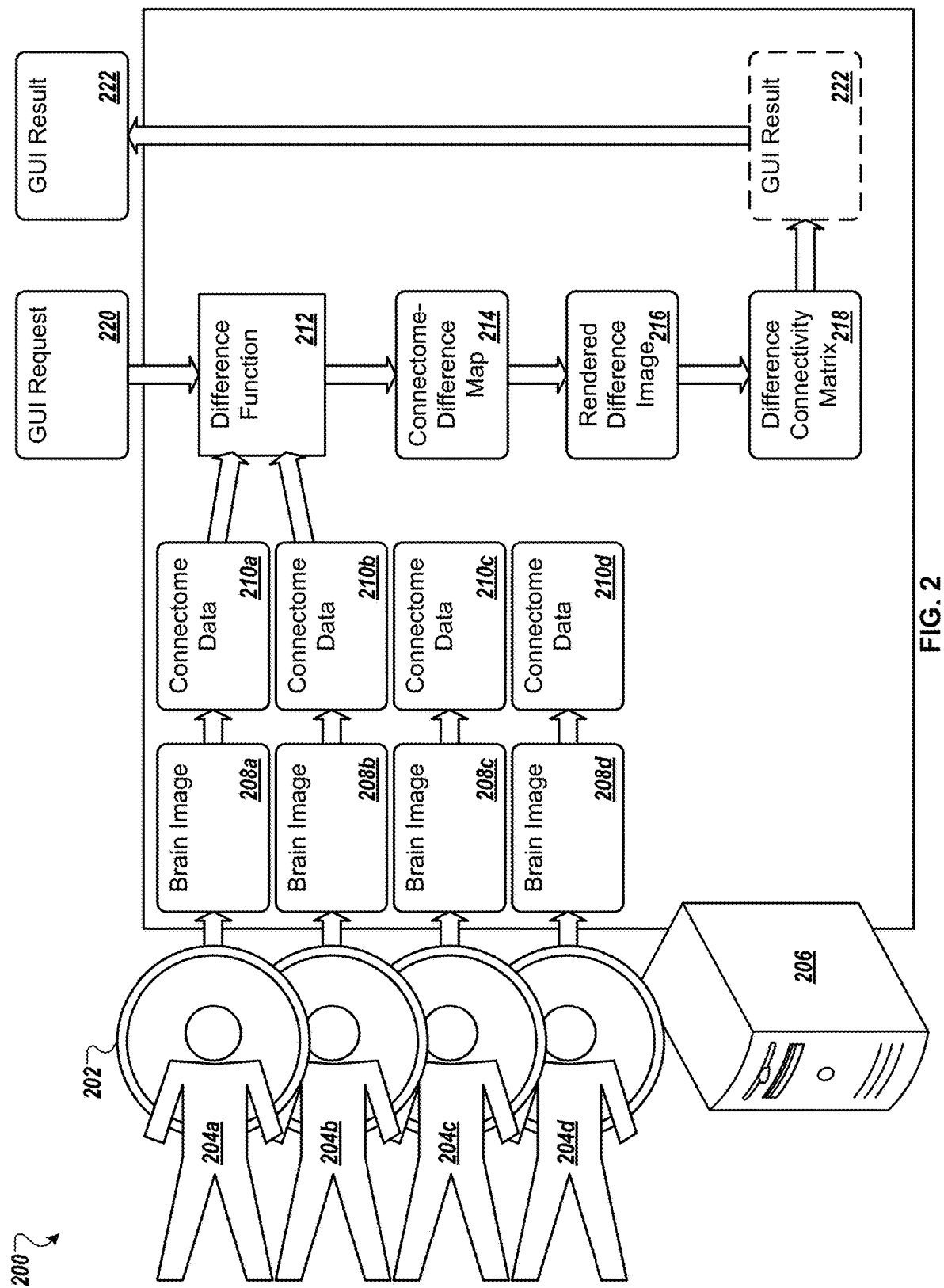
FIG. 2 shows an example system for generating medical images with connectome-difference map generation.

FIG. 2 shows an example system 200 for generating medical images with connectome-difference map generation. In the system 200, a medical imager 202 images a subject 204 at various time points (e.g., before or after an event), or the imager 202 can image different subjects 204a, 204b, 204c, 204d, etc. Alternatively (not shown) two or more medical imagers (not shown) may be used, and provide data, e.g., across one or more networks, from the imaging apparatus to computing apparatus 206 for processing and storage.

The medical imager 202 represents any sort of device that generates medical images, including images that are only stored as binary (or similar) data and never rendered into a graphical format. Examples include functional magnetic resonance imaging (fIVIRI) machines, magnetic resonance imaging Mill machines, and computed tomography machines. The subject 204a is imaged by the medical imager 202 to generate brain image 208a. The subject 204b (e.g., the same subject at the later time, or a different subject) is imaged by the same imager 202 or another imager (not shown) to generate brain images 208b. As will be appreciated, the various brain images 208a-208d may or may not have been gathered with the intention of being used to generate difference data as will be described in this specification. For example, a medical patient may receive imaging for one reason, then later suffer an unexpected brain injury. The same subject may in this case have imaging done after the injury to find differences caused by the injury. In another example, subject 204a may be a representative of a population different than subject 204b (as will be understood, aggregates may be used instead of just single subjects). For example, subject 204a may have an illness, organic defect, or otherwise experience an atypical medical condition. To compare, subject 204b, who has not experienced the same medical condition and is expected to be generally healthy may be used as a point of comparison. In another example, subjects 204a and 204b may both be typical, healthy people belonging to different demographics, including statistical demographics like age, nationality, gender, or sex; behavioral demographics like right-handed vs left-handed, measured risk tolerance, chosen occupation, etc. In such a way, differences between healthy populations may be investigated to formulate understandings for neurological contributions to, or changes due to, various demographic classifications, and behavioral experiences.

The brain images 208 can be processed by apparatus 206 into corresponding connectome data 210. For example, time series activity can be processed to produce a connectivity correlation matrix arranged by voxel or by parcellation. Examples of such processing can be found, for example, in U.S. application Ser. Nos. 17/066,171 and 17/066,178, the contents of which are hereby incorporated by reference herein in their entirety.

Apparatus 206 can execute a difference function 212 to generate a difference-record recording of a record of structural differences and also a record of functional differences. This record can include a difference map 214 in the form of a graph of edges and nodes, and a connectivity matrix 218 as a two-dimensional matrix storing data in cells of the matrix to represent connectivity values recorded as the edges in the graph. Other types of difference maps are possible and may be used in addition to, or instead of, a difference map of connectivity matrices. For example, differences of data derived from the connectivity matrices may be generated. In one case aggregate measures or metrics (mean, median, or modal values; standard deviations; maximum and minimum values; measures of entropy or conformity to known mathematical distributions) may be generated for each connectivity matrix, and the difference map can include differences between those metrics.

For example, the connectome data 210*a* and 210*b* may be stored on disk in a data structure useful for storing directed or undirected graphs containing nodes and edges. The connectome data can include a connectivity matrix 218 of the difference (e.g., the differences in correlation activity between two parcellations pre and post an event such a treatment or surgery), a list of all edges, or hash tables with indexes of the nodes and pointing to linked lists of other nodes connected to the indexed node, to name a few. The connectome difference map 214 may be stored on disk as a collection of binary values, and those binary values can be interpreted by apparatus 206. This map 214 may be used as input data for other functions, and/or may be rendered into one or more rendered difference images, as will be explained in more detail below. For example, apparatus 206 can use the map 214 to generate a displayable image 216 (e.g., a JPEG) or interactive interface that shows a two-dimensional matrix with cells shaded to show corresponding edges displayed in the map 214, and render a visual representation of the brain or brains imaged in 208*a* and 208*b*. See, for example, FIG. 3.

The connectomes 210 can define functional nodes in brain matter and edges that represent connections between the functional nodes. Between two brain images (e.g., 210*a* and 210*b*), a first functional node and a corresponding second functional node represent the same point of brain topology. For example, while the first functional node is in a first skull-location of the first subject and a second node is in a second skull-location of the second subject, the nodes may nevertheless be tied to the same functional location of a brain topology.

The system 200 can be configured so that the apparatus 206 is able to receive graphic user interface (GUI) requests 220 and operate as described in this document to generate a GUI result 222. For example, one or more client computing devices may connect to the apparatus 206 over a network (e.g., the Internet or a private data network). In some cases, the apparatus may be a physical server or virtual machine, or collections of machines working together, which operates as a webserver to provide a webpage as the GUI result 222. However, other arrangements are possible, such as serving data to be collected and used by a purpose-specific application with its own GUI functionality.

As will be appreciated, the speed and scale of data generated in such processes may be quite significant, and producing results in clinically-useful time-frames may require the use of specialized data pre-processing, efficient data networking technologies, and data storage techniques. For example, each brain image 208*a*-208*d* can both require an hour or hours of processing time each to produce the data 210*a*-210*d* when using consumer, off the shelf computing products. When faster speed is required, more advanced processing may be accessed via cloud-provided computational resources. Accessing such resources provides advantages of producing GUI results 222 in shorter timescales. When time is a critical factor (e.g., a patient awaiting emergency surgery), slower processing by slower machines or human computation may not provide the advantage due to the size and scale of the processing described here.

Figure 3A:
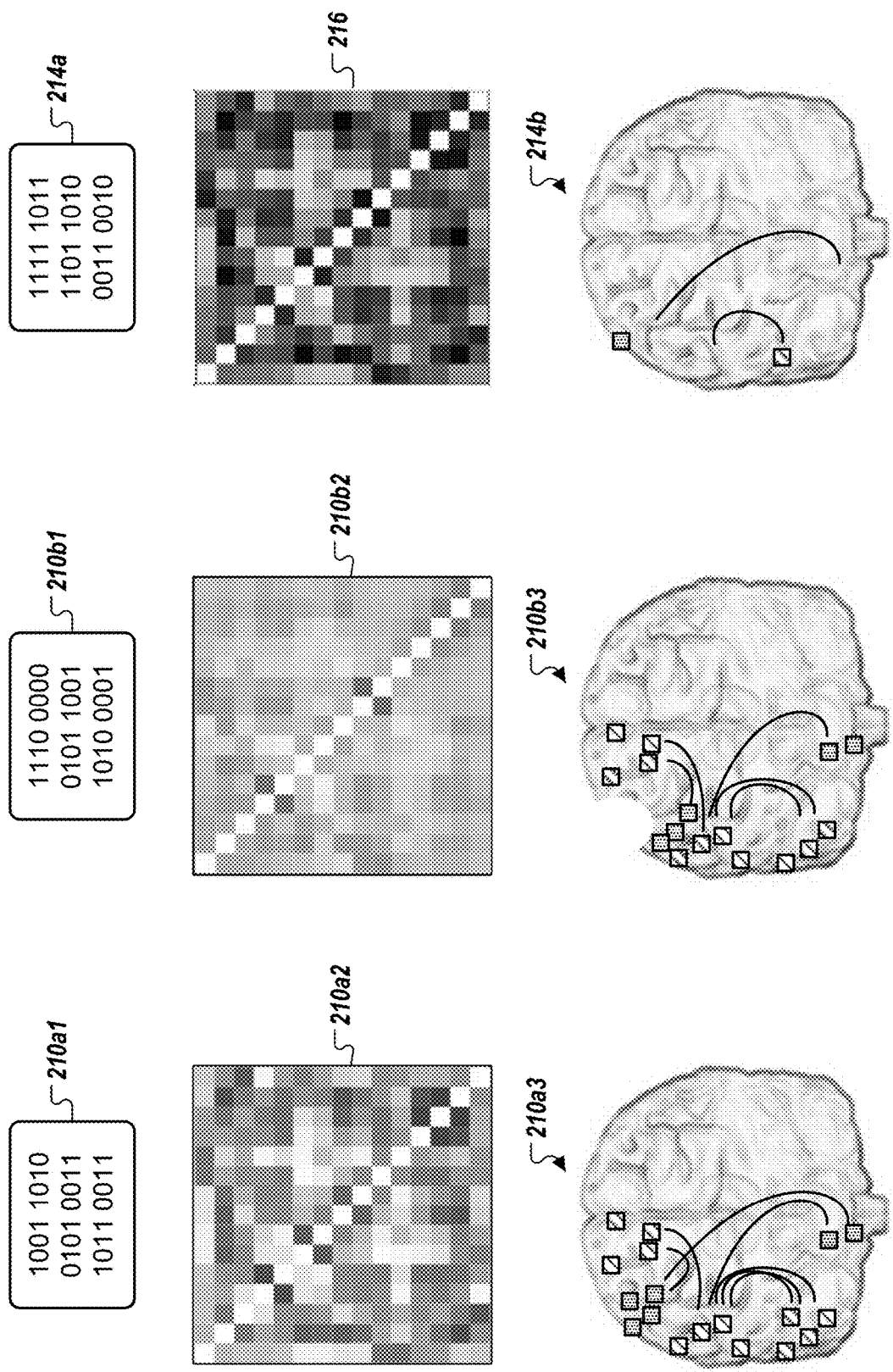
FIGS. 3A and 3B show example data stored in computer systems for generating medical images and graphical user interfaces.
Figure 3B:
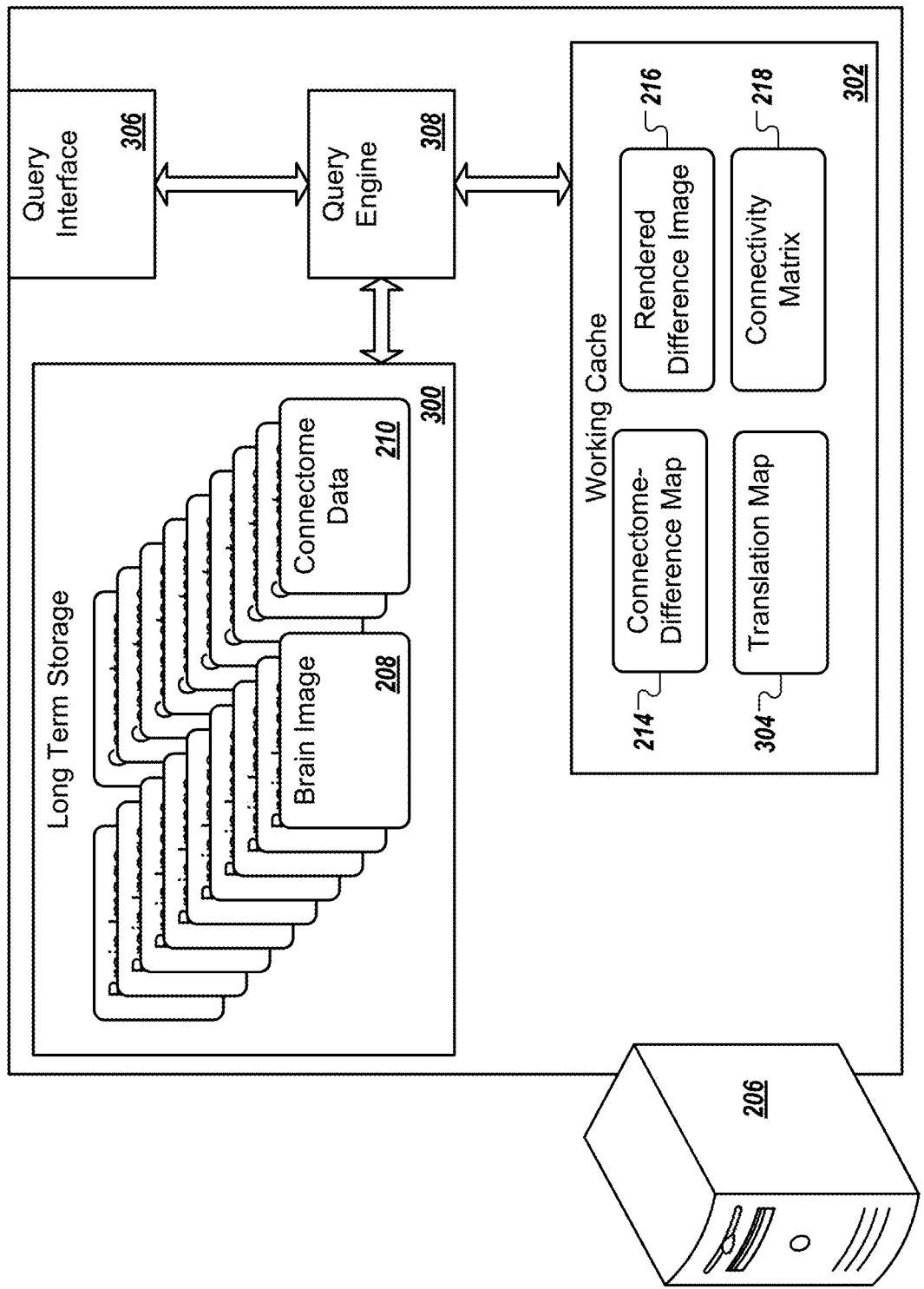

FIGS. 3A and 3B show example data stored in computer systems for generating medical images and graphical user interfaces. Shown in FIG. 3A are three views of the connectome data 210*a*, with binary data shown as 210*a*1, a connectivity matrix shown as 210*a*2, and a rendered connectome image as 210*a*3. Similarly, connectome data 210*b* is shown with binary data 210*b*1, connectivity matrix 210*b*2, and rendered image 210*b*3. The difference between 210*a* and 210*b* is stored as the connectome-difference map 214 shown in binary 214*a* and rendered image 214*b*. The difference connectivity matrix 216 is shown graphically as well.

As will be understood, this data can be stored on disk as binary data. This binary data can be loaded into a processor for computation, transmitted over computer networks, compressed, copied, etc.

As can be seen, data here is shown to display data for i) a first brain image 208*a*, ii) a second brain image 208*b*, iii) a difference map 214, and iv) a connectivity element (e.g., a difference connectivity matrix 218) that has properties representing differences in connectivity between the first brain image and the second brain image. As show in 210*a*3, 210*b*3, and 214*b*, the data can be organized or interpreted as nodes representing a location in the brain, and edges connecting nodes where the connected nodes have correlated activity. For example, in one implementation if two nodes share an edge, the parcellations represented by these two nodes often activate at the same time or in succession with each other. In this way, the nodes define functional areas of the brain and activate when the brain is performing functions, and the edges show areas of the brain that are away from each other, but that work together.

In some cases, each node may map 2-to-1 to each parcelation in a parcelation scheme of the brain. However, other arrangements are possible. For example, a node may represent groups of parcelations. This may be desirable when less detailed information is useful for a particular purpose (e.g., showing a rendering at a readable resolution may not require as much detailed connectome data). However, for some other uses (e.g., machine-learning data generation) the higher-detail 2-to-1 mapping may be more beneficial.

In some cases, the connectomes 210*a* and 210*b* are topologically invariant. Brain function can be tied to two-dimensional topology (i.e. surface shape) of the brain, but not to the underlying three-dimensional morphology of the brain. Some events can change brain morphology (e.g., removal of a tumor, some traumatic injuries), which may have topological changes (changes to the two-dimensional surface of the brain) as well as non-topological changes (changes that do not change the two-dimensional surface of the brain. However, these non-topological changes can influence the location in three-dimensional space within the subject's skull, in which a given point of topology resides. For example, removal of a tumor may cause the surrounding brain tissue to sag, maintaining the same topology but in a new location in the skull.

A first functional node in the connectomes 210*a* and a corresponding second functional node in the connectome 210*b* can represent the same point of brain topology. When the morphological change occurs without changing the node at issue, the first functional node is in a first location in the skull of the subject and the second node is in a second, possibly different, location in the skull of the subject. This location may vary in space as a tumor can change the volume of the brain, or plasticity can re-assign brain tissue to other functions As such, the connectomes 210*a* and 210*b* may be topologically invariant. For example, a node in the connectome 210*a* can have the same topological location as the corresponding node in the connectome 210*b*. This topological invariance ensures that the connectomes are tied to areas (e.g., parcelations) on the topology in order to preserve functional features of the brain pre and post, for example, sagging.

The connectome-difference map 214 records the difference between the connectomes 210a and 210b. For example, the connectome-difference map 214 can record edges that appear or disappear between the two connectomes 210a and 210b, and may also record changes in weight of one or more edges representing connections between the nodes (e.g., parcelations). In instances where a disappearing node is destroyed or otherwise only present in on connectome but not the other, the edges between that disappearing node and other nodes can also disappear.

Renderings 210a2, 210a3, 210b2, 210b3, 214b, and 216 show example renderings of data stored on disk. As will be appreciated, the data stored on disk may be rendered by apparatus 206 into various useful visual appearances for use in creating the GUI result 222.

FIG. 3B shows various components of the apparatus 206. As previously described, the size and scope of the data being processed, combined with the need for responsiveness, results in a need for specific computing arrangements to meet the needs of the technology.

A long term storage 300 and a working cache 302 can be used by the apparatus 206 to store data. For data that is expected to be needed for a long period of time, such as brain images 208 and connectome data 210, the long term storage can be used to store the data. For data that is not expected to be needed for long periods of time, or for which it would be infeasible to store, the working cache 302 can be used to store data that is currently being worked on or being produced. As will be understood, the number of combinations of two different connectomes 210 is much, much larger than the number of connectomes 210. As such, when a comparison of two connectomes is needed, the apparatus 206 may operate on the two connectomes 210 at that time instead of preprocessing and storing the difference map for every combination of connectomes. For this use case, the working cache 302 may be equipped with less storage space, but faster read and write times, than the long term storage 300.

A query interface 306 can receive queries from external and internal clients and provide the queries to the query engine 308. The query engine 308 can then access the needed image 208 and/or connectome 210, and perform operations in the working cache 302.

In addition to generating the difference map 214, the rendered difference image 216, and the connectivity matrix 218, the query engine 308 can also generate a translation map 304. The translation map 304 identifies areas in the different data structures that relate to the same place in a parcellation of a brain. That is to say, a translation map 304 can show correspondences among pairs of brain images 208 and connectome data 210 along with the corresponding difference map 214, difference image 216, and difference connectivity matrix 218. This translation map 304 can record correspondences between pixels of a i) the first brain image, ii) a second brain image, iii) a difference map, and iv) a connectivity element such that the correspondences record the different relative pixel locations. A GUI that uses the translation map 304 to enable a new form of user interface is explained with respect to FIG. 4. Pixels and pixel locations can include two dimensional (2D) elements, three dimensional (3D) elements (sometimes also called voxels), or other elements depending on the configuration of the technology being used.

Figure 4:
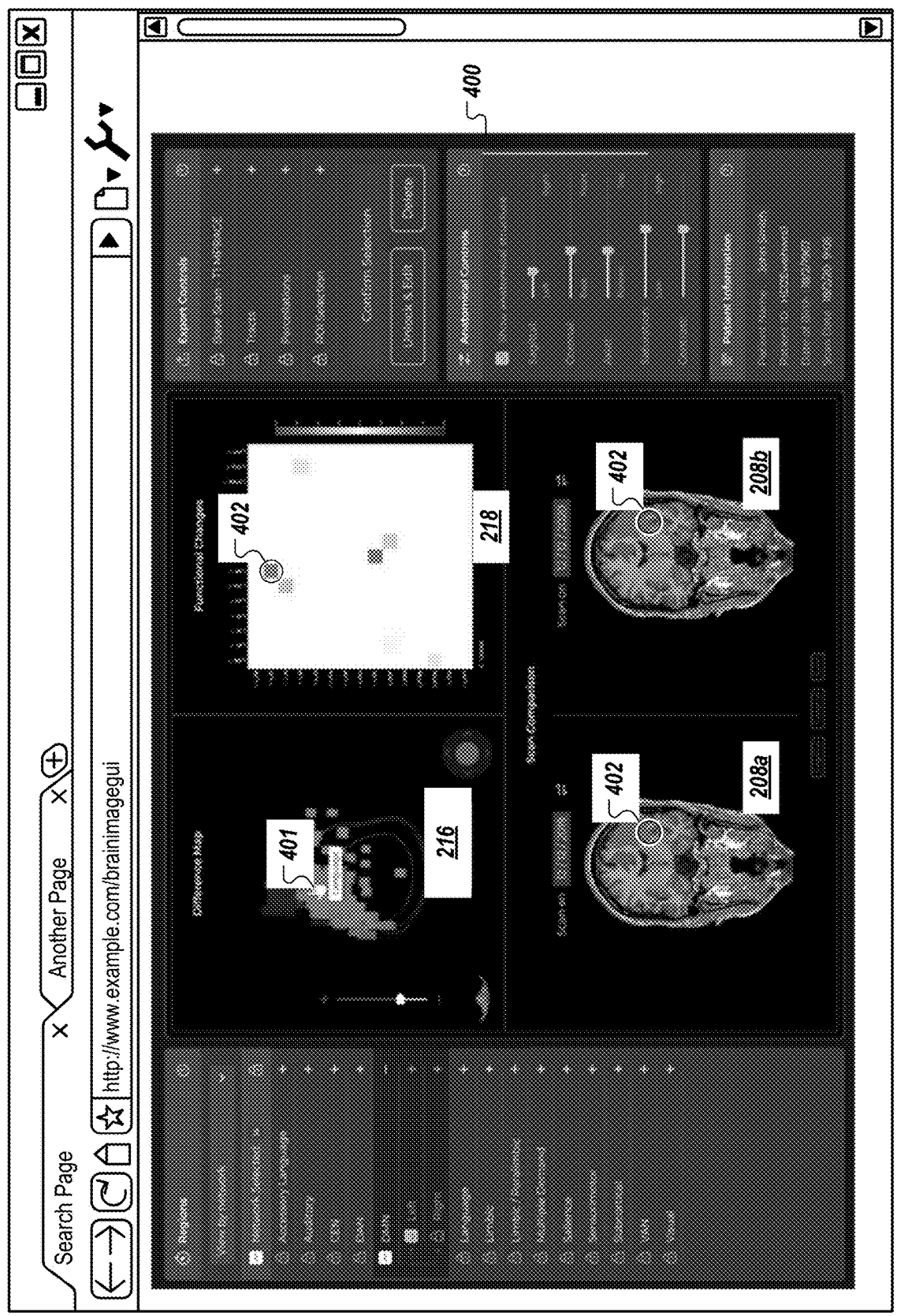
FIG. 4 shows an example of an interactive graphical user interface for displaying brain images and other related information with features for aiding in the visual understanding of similar information in different representations of brain images.

FIG. 4 shows an example of an interactive GUI 400 for displaying brain images and other related information with features for aiding in the visual understanding of similar information in different representations of brain images. The GUI 400 is being used to show a user a pair of brain images 208a and 208b, their rendered difference image 216 showing the difference map 214, and their difference connectivity matrix 218. This type of data is very complex and dense, and it has been found that many users have difficulty finding the correlations between the different displays. For example, a cursor is shown above the image 216, selecting a portion of the difference map 216 related to the language functionality of the brain. To see, on the images 208a and 208b, where the corresponding sections are, the user would need to know where in the brain to look on two images simultaneously while still keeping track of the location in the image 216. Then, with all this identified, the user would need to find a location in the connectivity matrix 218 related to language. In practice, it has been found that even highly skilled users are unable to perform this task.

Therefore, to solve this problem, new GUI elements are presented which solve this problem that users can have using a computer interface showing brain images, difference maps, and or connectivity matrices. As will be described, the user may select a portion of one of these displays, and corresponding locations in the other displays will create a highlight 402 to show the corresponding functional location in the other displays.

The GUI 400 is partitioned into sets of bounding boxes, one for each of the images 208a, 208b, 216, and 218. These images are concurrently displayed, allowing the user to see them all at once, or focus on one at a time without the need to navigate away. As shown here, the elements are shown without overlap. However, in some cases (not shown) a difference map 216 or other element may be shown overlaid with, for example, an image 208a or 208b.

A location for user input is tracked. In this example, a cursor 401 in the shape of a finger can be moved in the GUI 400 by movement of a physical mouse held in the user's hand, though other configurations for input location are possible. When the user input 401 is within one of the bounding boxes, the highlights 402 are shown in the other bounding boxes. In this example, the user input 401 is within the display of the difference map 216. In response, the GUI can modify the display of the i) first brain image 208a, ii) second brain image 208b, and iii) the connectivity element 218 to highlight elements of the display that correspond to an element of the difference map 216 that corresponds to the location of the user input 401. As the user moves their cursor around over different portions of the map 216, the highlights 402 can also move around within their bounding boxes.

When the user moves the cursor to other bounding boxes, similar behavior can be presented. For example, when the user input 401 is within the display of the first brain image 208a, the GUI 400 can modify the display of the i) second brain image 208b, ii) the difference map 216, and iii) the connectivity element 218 to highlight elements of the display that correspond to an element of the first brain image 208a that corresponds to the location of the user input 401. For example, when the user input 401 is within the display of the second brain image 208b, the GUI can modify the display of the i) first brain image 208a, ii) the difference map 216, and iii) the connectivity element 218 to highlight elements of the display that correspond to an element of the second brain image that corresponds to the location of the user input 401. For example, when the user input 401 is within the display of the connectivity element 218, the GUI can modify the display of the i) first brain image 208a, ii) second brain image 208b, and iii) the difference map 216 to highlight elements of the display that correspond to an element of the connectivity element that corresponds to the location of the user input 401.

As can be seen, the correspondence is not as simple as finding an XY location of the input 401 within one bounding box, and then highlighting the same XY location in the other bounding boxes. Because the images shown are fundamentally different (e.g., one is a render of a slice of a brain, while the other is an abstract rendering of the cells of a 2D matrix), the computer generating the GUI can use the translation map 304 to determine which XY location in each bounding box without the input 401 to highlight.

In one implementation, map 304 can take the form of a table. Each row of the table may have four columns, with one column per bounding box. When the input is in the bounding box of the map 216, the computer creating the GUI 400 can look up the row with that XY value for the row for the map 216. Then, the other columns can hold different XY positions for the three other bounding boxes. The GUI can use those other XY positions for the creation of the highlights 402. Later, when the input 401 is over the connectivity matrix 218, the computer can look up the XY position within the column for the matrix 218 instead of for the map 216 as was done when the input was in the map 216.

In this way, a GUI 400 is provided (in this case as a webpage in a web browser, but other formats are possible) that provides new functionality (highlighting) to solve a human interface problem (tracking correspondences between different types of data presentation).

Figure 5:
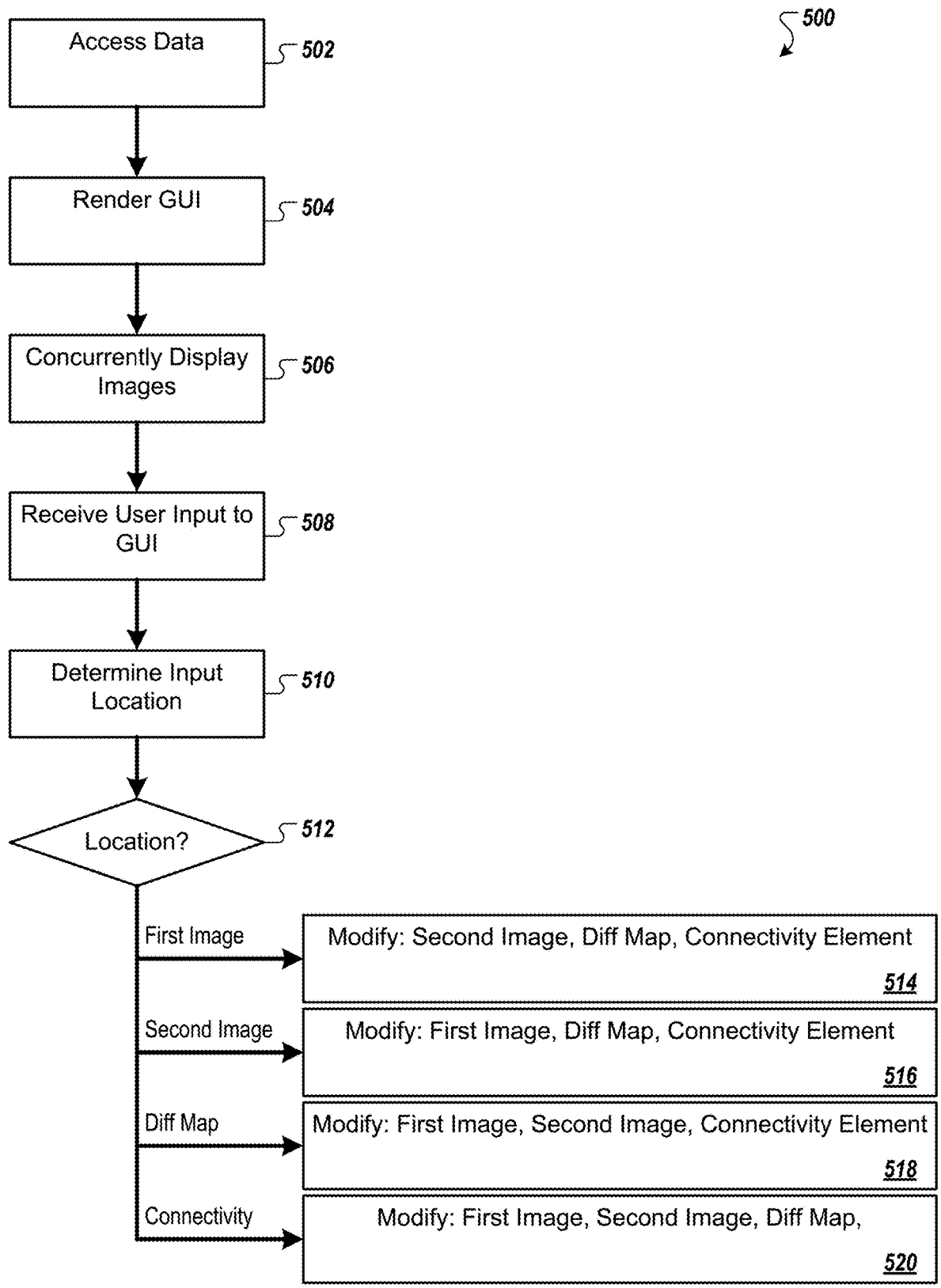
FIG. 5 is a flowchart of an example process for generating composite-connectomes from collections of single-connectomes.

FIG. 5 is a flowchart of an example process 500 for generating composite-connectomes from collections of single-connectomes. This example will use the system 200, the GUI 400, and the associated data for purposes of explanation. However, the process 500 or similar processes may be performed using other systems and GUIs.

Data is accessed 502 from a computer-accessible memory. For example, i) a first brain image, ii) a second brain image, iii) a difference map, and iv) a connectivity element having properties representing differences in connectivity between the first brain image and the second brain image are accessed. For example, in response to receiving a GUI request 220, the apparatus 206 can access the brain images 208a and 208b, can generate the difference map 214, render the difference map to the rendered difference image 216, and generate the difference connectivity matrix 218.

A GUI is rendered 504. For example, the apparatus 206 can serve a dynamic webpage as the GUI result 222 to render the GUI 400.

The GUI concurrently displays 506 i) the first brain image, ii) the second brain image, iii) the difference map, and iv) the connectivity element. For example, the GUI can show, at the same time, the brain images 208a and 208b, the difference map to the rendered difference image 216, and the difference connectivity matrix 218.

User input is received 508 to the GUI. For example, the user can provide input via a mouse, touchpad, etc. to move the cursor 401 in the GUI 400.

A location of the input is determined 510. For example, the bounding box in which the cursor 104 is location can first be found. Then, once the correct bounding box is identified, the XY position within the bounding box can be found. The translation map 304 can be used with the combination of i) bounding box identifier and ii) XY position within the bounding box, to identify corresponding locations in other bounding boxes for the displays of other images or data.

If the location is in the first image 512, the GUI modifies 514 the display of the i) second brain image, ii) the difference map, and iii) the connectivity element to highlight elements of the display that correspond to an element of the first brain image that corresponds to the location of the user input. If the location is in the second image 512, the GUI modifies the display of the i) first brain image, ii) the difference map, and iii) the connectivity element to highlight elements of the display that correspond to an element of the second brain image that corresponds to the location of the user input. If the location is in the difference map 512, the GUI modifies the display of the i) first brain image, ii) second brain image, and iii) the connectivity element to highlight elements of the display that correspond to an element of the difference map that corresponds to the location of the user input. If the location is in the connectivity element 512, the GUI modifies the display of the i) first brain image, ii) second brain image, and iii) the difference map to highlight elements of the display that correspond to an element of the connectivity element that corresponds to the location of the user input.

Example Embodiments

1. A system for generating medical images, the system comprising:
   one or more processors; and
   computer memory storing instructions that, when executed by the one or more processors, cause the one or more processors to perform operations, comprising:
     accessing a first connectome, the first connectome defining i) first functional nodes in brain matter and ii) first edges that represent connections between the first functional nodes;
     accessing a second connectome, the second connectome defining i) second functional nodes in brain mater and ii) second edges that represent connections between the second functional nodes;
     generating a difference-record that stores data reflective of a difference between the first connectome and the second connectome, the difference-record comprising a record of structural differences and also a record of functional differences; and
     taking an action based on the difference-record.

2. The system of embodiment 1, wherein the record of structural differences is a difference map and the record of functional differences is a connectivity matrix.

3. The system of embodiment 1, wherein operations further comprising:
   imaging a subject to generate first brain image data;
   separately imaging the subject to generate second brain image data;
   generating the first connectome from the first brain image data; and
   generating the second connectome from the second brain image data.

4. The system of embodiment 1, wherein the operations further comprising:
   imaging a subject to generate first brain image data;
   separately imaging a second subject to generate second brain image data;
   generating the first connectome from the first brain image data; and
   generating the second connectome from the second brain image data.

5. The system of embodiment 4, wherein a first functional node and a corresponding second functional node represent the same point of brain topology, and wherein the first functional node is in a first skull-location of the first subject and the second node is in a second skull-location of the second subject.

6. The system of embodiment 1, the operations further comprising generation of a proposed therapy plan for a patient based on the difference-record.

These and other embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for generating composite-connectomes from collections of single-connectomes, the system comprising:
   one or more processors;
   computer memory storing instructions that, when executed by the processors, cause the processors to perform operations comprising:
   accessing, from a computer-accessible memory, i) a first brain image, ii) a second brain image, iii) a difference map, and iv) a connectivity element having properties representing differences in connectivity between the first brain image and the second brain image and rendering a graphical user interface (GUI), comprising:
   concurrently displaying i) the first brain image, ii) the second brain image, iii) the difference map, and iv) the connectivity element, wherein at least some of the corresponding elements in the displays of the i) first brain image, ii) the second brain image, iii) the difference map, and iv) the connectivity element have different relative pixel locations, and wherein the GUI includes a sets of bounding boxes, such that bounding boxes of the set are located on corresponding elements in the display;
   receiving user input to the GUI;
   determining a location of the user input; and
   responsive to determining that the location of the user input is within the display of the connectivity element, modifying the display of the i) first brain image, ii) second brain image, and iii) the difference map to highlight elements of the display that correspond to an element of the connectivity element that corresponds to the location of the user input.

2. The system of claim 1, wherein the operations further comprise:
   responsive to determining that the location of the user input is within the display of the first brain image, modifying the display of the i) second brain image, ii) the difference map, and iii) the connectivity element to highlight elements of the display that correspond to an element of the first brain image that corresponds to the location of the user input;
   responsive to determining that the location of the user input is within the display of the second brain image, modifying the display of the i) first brain image, ii) the difference map, and iii) the connectivity element to highlight elements of the display that correspond to an element of the second brain image that corresponds to the location of the user input; and
   responsive to determining that the location of the user input is within the display of the difference map, modifying the display of the i) first brain image, ii) second brain image, and iii) the connectivity element to highlight elements of the display that correspond to an element of the difference map that corresponds to the location of the user input.

3. The system of claim 1, wherein concurrently displaying i) the first brain image, ii) the second brain image, iii) the difference map, and iv) the connectivity element comprises displaying, without overlap i) the first brain image, ii) the second brain image, iii) the difference map, and iv) the connectivity element.

4. The system of claim 1, wherein concurrently displaying i) the first brain image, ii) the second brain image, iii) the difference map, and iv) the connectivity element comprises displaying the difference map over at least one of the group consisting of i) the first brain image, and ii) the second brain image.

5. The system of claim 1, wherein the connectivity element comprises a two-dimensional matrix storing data in cells of the matrix to represent connectivity values.

6. A method for generating composite-connectomes from collections of single-connectomes, the method comprising accessing, from a computer-accessible memory, i) a first brain image, ii) a second brain image, iii) a difference map, and iv) a connectivity element having properties representing differences in connectivity between the first brain image and the second brain image and rendering a graphical user interface (GUI), comprising:
   concurrently displaying i) the first brain image, ii) the second brain image, iii) the difference map, and iv) the connectivity element, wherein at least some of the corresponding elements in the displays of the i) first brain image, ii) the second brain image, iii) the difference map, and iv) the connectivity element have different relative pixel locations, and wherein the GUI includes a sets of bounding boxes, such that bounding boxes of the set are located on corresponding elements in the display;

receiving user input to the GUI;

determining a location of the user input; and responsive to determining that the location of the user input is within the display of the connectivity element, modifying the display of the i) first brain image, ii) second brain image, and iii) the difference map to highlight elements of the display that correspond to an element of the connectivity element that corresponds to the location of the user input.

7. The method of claim 6, the method further comprising:

responsive to determining that the location of the user input is within the display of the first brain image, modifying the display of the i) second brain image, ii) the difference map, and iii) the connectivity element to highlight elements of the display that correspond to an element of the first brain image that corresponds to the location of the user input;

responsive to determining that the location of the user input is within the display of the second brain image, modifying the display of the i) first brain image, ii) the difference map, and iii) the connectivity element to highlight elements of the display that correspond to an element of the second brain image that corresponds to the location of the user input; and responsive to determining that the location of the user input is within the display of the difference map, modifying the display of the i) first brain image, ii) second brain image, and iii) the connectivity element to highlight elements of the display that correspond to an element of the difference map that corresponds to the location of the user input.

8. The method of claim 6, wherein the method further comprises accessing a translation map that records correspondences between pixels of the i) the first brain image, ii) the second brain image, iii) the difference map, and iv) the connectivity element such that the correspondences record the different relative pixel locations.

9. The method of claim 6, wherein concurrently displaying i) the first brain image, ii) the second brain image, iii) the difference map, and iv) the connectivity element comprises displaying, without overlap i) the first brain image, ii) the second brain image, iii) the difference map, and iv) the connectivity element.

10. The method of claim 6, wherein concurrently displaying i) the first brain image, ii) the second brain image, iii) the difference map, and iv) the connectivity element comprises displaying the difference map over at least one of the group consisting of i) the first brain image, and ii) the second brain image.

11. The method of claim 6 wherein the connectivity element comprises a two-dimensional matrix storing data in cells of the matrix to represent connectivity values.

12. A non-transitory computer-readable media storing instructions that, when executed by one or more processors, cause the processor to perform operations comprising accessing, from a computer-accessible memory, i) a first brain image, ii) a second brain image, iii) a difference map, and iv) a connectivity element having properties representing differences in connectivity between the first brain image and the second brain image and rendering a graphical user interface (GUI), comprising:

concurrently displaying i) the first brain image, ii) the second brain image, iii) the difference map, and iv) the connectivity element, wherein at least some of the corresponding elements in the displays of the i) the first brain image, ii) the second brain image, iii) the difference map, and iv) the connectivity element have different relative pixel locations, and wherein the GUI includes a sets of bounding boxes such that bounding boxes of the set are located on corresponding elements in the display;

receiving user input to the GUI;

determining a location of the user input; and responsive to determining that the location of the user input is within the display of the connectivity element, modifying the display of the i) first brain image, ii) second brain image, and iii) the difference map to highlight elements of the display that correspond to an element of the connectivity element that corresponds to the location of the user input.

13. The media of claim 12, wherein the operations further comprise:

responsive to determining that the location of the user input is within the display of the first brain image, modifying the display of the i) second brain image, ii) the difference map, and iii) the connectivity element to highlight elements of the display that correspond to an element of the first brain image that corresponds to the location of the user input;

responsive to determining that the location of the user input is within the display of the second brain image, modifying the display of the i) first brain image, ii) the difference map, and iii) the connectivity element to highlight elements of the display that correspond to an element of the second brain image that corresponds to the location of the user input; and responsive to determining that the location of the user input is within the display of the difference map, modifying the display of the i) first brain image, ii) second brain image, and iii) the connectivity element to highlight elements of the display that correspond to an element of the difference map that corresponds to the location of the user input.

14. The media of claim 12, wherein the operations further comprise accessing a translation map that records correspondences between pixels of the i) the first brain image, ii) the second brain image, iii) the difference map, and iv) the connectivity element such that the correspondences record the different relative pixel locations.

15. The media of claim 12, wherein concurrently displaying i) the first brain image, ii) the second brain image, iii) the difference map, and iv) the connectivity element comprises displaying, without overlap i) the first brain image, ii) the second brain image, iii) the difference map, and iv) the connectivity element.

16. The media of claim 12, wherein concurrently displaying i) the first brain image, ii) the second brain image, iii) the difference map, and iv) the connectivity element comprises displaying the difference map over at least one of the group consisting of i) the first brain image, and ii) the second brain image.

17. A system for generating composite-connectomes from collections of single-connectomes, the system comprising:

one or more processors;

computer memory storing instructions that, when executed by the processors, cause the processors to perform operations comprising:

accessing, from a computer-accessible memory, i) a first brain image, ii) a second brain image, iii) a difference map, and iv) a connectivity element having properties representing differences in connectivity between the first brain image and the second brain image and rendering a graphical user interface (GUI), comprising:

concurrently displaying i) the first brain image, ii) the second brain image, iii) the difference map, and iv) the connectivity element, wherein at least some of the corresponding elements in the displays of the i) the first brain image, ii) the second brain image, iii) the difference map, and iv) the connectivity element have different relative pixel locations, and wherein the GUI includes a set of bounding boxes, such that bounding boxes of the set are located on corresponding elements in the display;

receiving user input to the GUI;

determining a location of the user input;

accessing a translation map that records correspondences between pixels of the i) the first brain image, ii) the second brain image, iii) the difference map, and iv) the connectivity element such that the correspondences record the different relative pixel locations; and responsive to determining that the location of the user input is within the display of the connectivity element, modifying the display of the i) first brain image, ii) second brain image, and iii) the difference map to highlight elements of the display that correspond to an element of the connectivity element that corresponds to the location of the user input.

* * * * *